United States Patent
Medica et al.

(10) Patent No.: US 9,047,050 B2
(45) Date of Patent: Jun. 2, 2015

(54) MODULAR SYSTEM HAVING CROSS PLATFORM MASTER DEVICE

(75) Inventors: John Medica, Taipei (TW); Leonard Tsai, Taipei (TW); Shikuan Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 393 days.

(21) Appl. No.: 13/430,527

(22) Filed: Mar. 26, 2012

(65) Prior Publication Data

US 2013/0080670 A1 Mar. 28, 2013

Related U.S. Application Data

(63) Continuation-in-part of application No. 13/186,397, filed on Jul. 19, 2011, now Pat. No. 8,711,552.

(60) Provisional application No. 61/467,378, filed on Mar. 24, 2011.

(51) Int. Cl.
G06F 1/16 (2006.01)
H04M 1/725 (2006.01)
H04M 1/02 (2006.01)

(52) U.S. Cl.
CPC ......... *G06F 1/1632* (2013.01); *H04M 1/72527* (2013.01); *H04M 1/0254* (2013.01); *G06F 1/1626* (2013.01); *G06F 1/1669* (2013.01)

(58) Field of Classification Search
CPC .............. G06F 1/1632; G06F 1/1626; H04M 1/72527; H04M 1/0254
USPC .................. 710/110, 303; 455/557; 361/679; 343/876

See application file for complete search history.

(56) References Cited

U.S. PATENT DOCUMENTS

| | | | |
|---|---|---|---|
| 5,768,163 A | 6/1998 | Smith, II | |
| 5,793,957 A | 8/1998 | Kikinis et al. | |
| 5,983,073 A | 11/1999 | Ditzik | |
| 5,999,952 A * | 12/1999 | Jenkins et al. | 708/100 |
| 6,243,578 B1 * | 6/2001 | Koike | 455/557 |

(Continued)

FOREIGN PATENT DOCUMENTS

| | | |
|---|---|---|
| TW | 200949564 | 12/2009 |
| TW | 201146148 | 12/2011 |

OTHER PUBLICATIONS

NPL—Antelope Technologie, Modular Computing Platform; 21 pages, Dated Oct. 27, 2003.*

*Primary Examiner* — Brian Misiura
(74) *Attorney, Agent, or Firm* — Liu & Liu

(57) ABSTRACT

A modular system of devices, in which a (master) device can be combined with one or more of the other (slave) devices in the system to form a functional electronic device (e.g., handheld cellular phone, tablet computing device), having different functionalities and features in different form factors across various platforms. The master device provides control and/or stored data to operate the slave devices, to reduce redundancy between devices of various form factors and/or platforms, in a manner that provides additional or different functions and features in an optimized and/or enhanced manner as the form factor and/or platform changes from one to another. The master device is not functional independent without attachment to a slave device. The master device requires at least a peripheral component (e.g., a display module) provided by the slave device to become an overall functional unit.

19 Claims, 11 Drawing Sheets

(56) References Cited

U.S. PATENT DOCUMENTS

| | | |
|---|---|---|
| 6,489,932 B1 * | 12/2002 | Chitturi et al. .................. 345/30 |
| 6,538,880 B1 | 3/2003 | Kamijo et al. |
| 6,654,842 B1 | 11/2003 | Park |
| 6,665,190 B2 * | 12/2003 | Clayton et al. ................. 361/736 |
| 6,735,663 B2 | 5/2004 | Watts, Jr. et al. |
| 6,779,068 B2 | 8/2004 | Kim |
| 6,798,647 B2 | 9/2004 | Dickie |
| 6,816,925 B2 | 11/2004 | Watts, Jr. |
| 6,978,010 B1 | 12/2005 | Short et al. |
| 7,010,634 B2 | 3/2006 | Silvester |
| 7,014,484 B2 | 3/2006 | Hagiwara |
| 7,054,965 B2 | 5/2006 | Bell et al. |
| 7,149,837 B2 | 12/2006 | Watts, Jr. et al. |
| 7,152,125 B2 | 12/2006 | Garney et al. |
| 7,253,586 B2 | 8/2007 | Kangas et al. |
| 7,254,015 B2 | 8/2007 | Yin et al. |
| 7,266,774 B2 | 9/2007 | Jones |
| 7,342,571 B2 | 3/2008 | Fraser et al. |
| 7,587,717 B2 | 9/2009 | Garney et al. |
| 7,706,850 B2 * | 4/2010 | Parivash .................... 455/575.4 |
| 7,911,445 B2 * | 3/2011 | Gettemy et al. ............. 345/156 |
| 7,966,578 B2 | 6/2011 | Tolmasky et al. |
| 8,041,873 B2 * | 10/2011 | Chu ............................... 710/313 |
| 8,050,715 B1 * | 11/2011 | Cole .............................. 455/557 |
| 8,405,978 B2 | 3/2013 | Okutsu |
| 8,630,088 B2 * | 1/2014 | Collopy et al. .......... 361/679.55 |
| 8,677,378 B2 * | 3/2014 | Murotake et al. ............. 719/313 |
| 8,725,205 B2 * | 5/2014 | Ryan ........................ 455/556.1 |
| 8,892,160 B2 * | 11/2014 | Daniel ....................... 455/552.1 |
| 2003/0154291 A1 * | 8/2003 | Ocheltree et al. ............. 709/228 |
| 2005/0185364 A1 | 8/2005 | Bell et al. |
| 2007/0073936 A1 * | 3/2007 | Cardenas et al. ................ 710/62 |
| 2007/0101039 A1 * | 5/2007 | Rutledge et al. .............. 710/303 |
| 2007/0182663 A1 | 8/2007 | Biech |
| 2008/0039160 A1 * | 2/2008 | Homer et al. .............. 455/575.7 |
| 2008/0144051 A1 | 6/2008 | Voltz et al. |
| 2009/0012841 A1 | 1/2009 | Saft et al. |
| 2009/0198852 A1 | 8/2009 | Rofougaran |
| 2009/0213032 A1 | 8/2009 | Newport et al. |
| 2009/0300251 A1 | 12/2009 | Lu |
| 2010/0060549 A1 | 3/2010 | Tsern |
| 2010/0060572 A1 | 3/2010 | Tsern |
| 2010/0064228 A1 | 3/2010 | Tsern |
| 2010/0318709 A1 | 12/2010 | Bell et al. |
| 2011/0292584 A1 | 12/2011 | Hung et al. |
| 2013/0077212 A1 | 3/2013 | Nakajima |

* cited by examiner

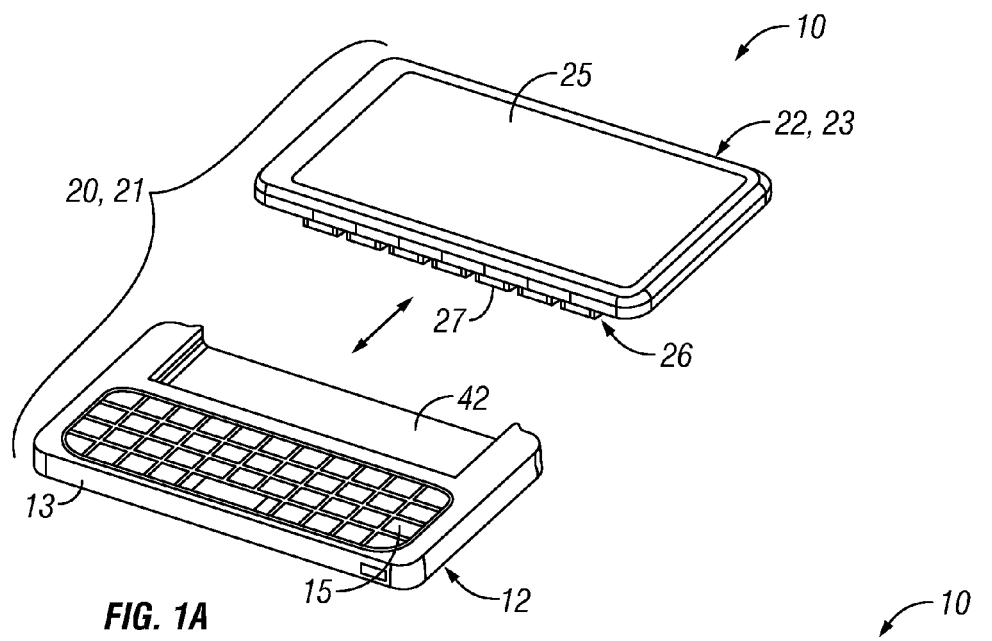
FIG. 1A
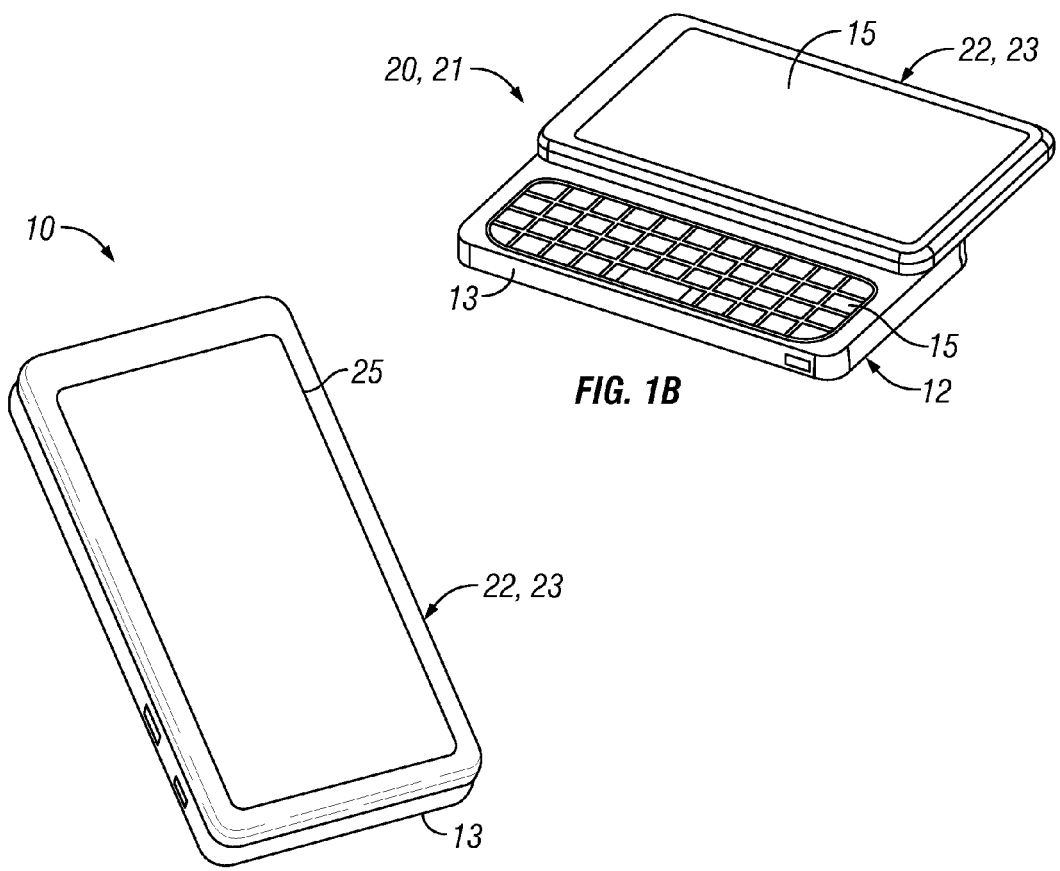
FIG. 1B
FIG. 1C

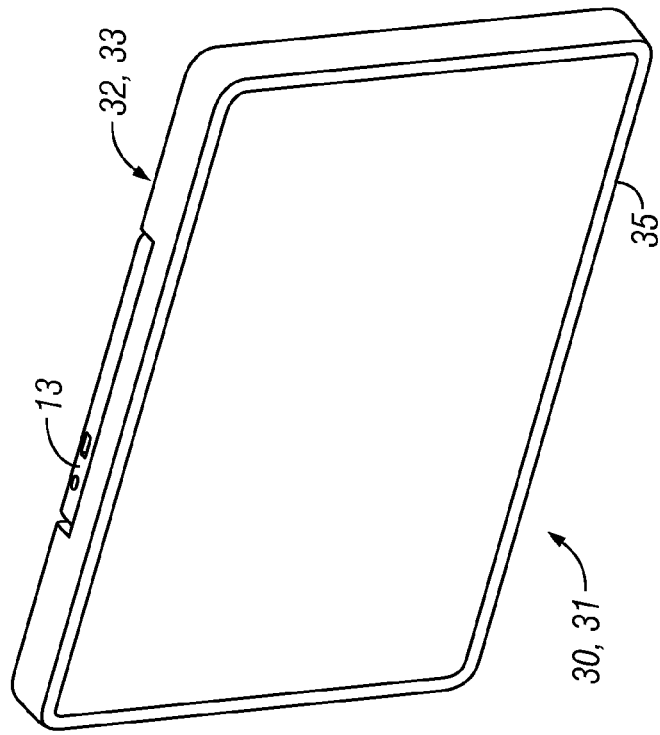
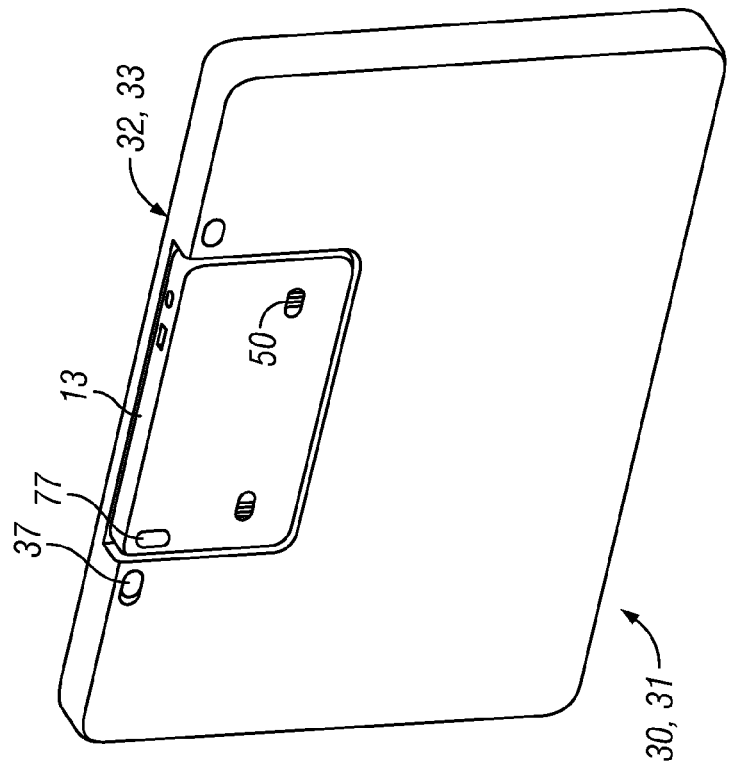

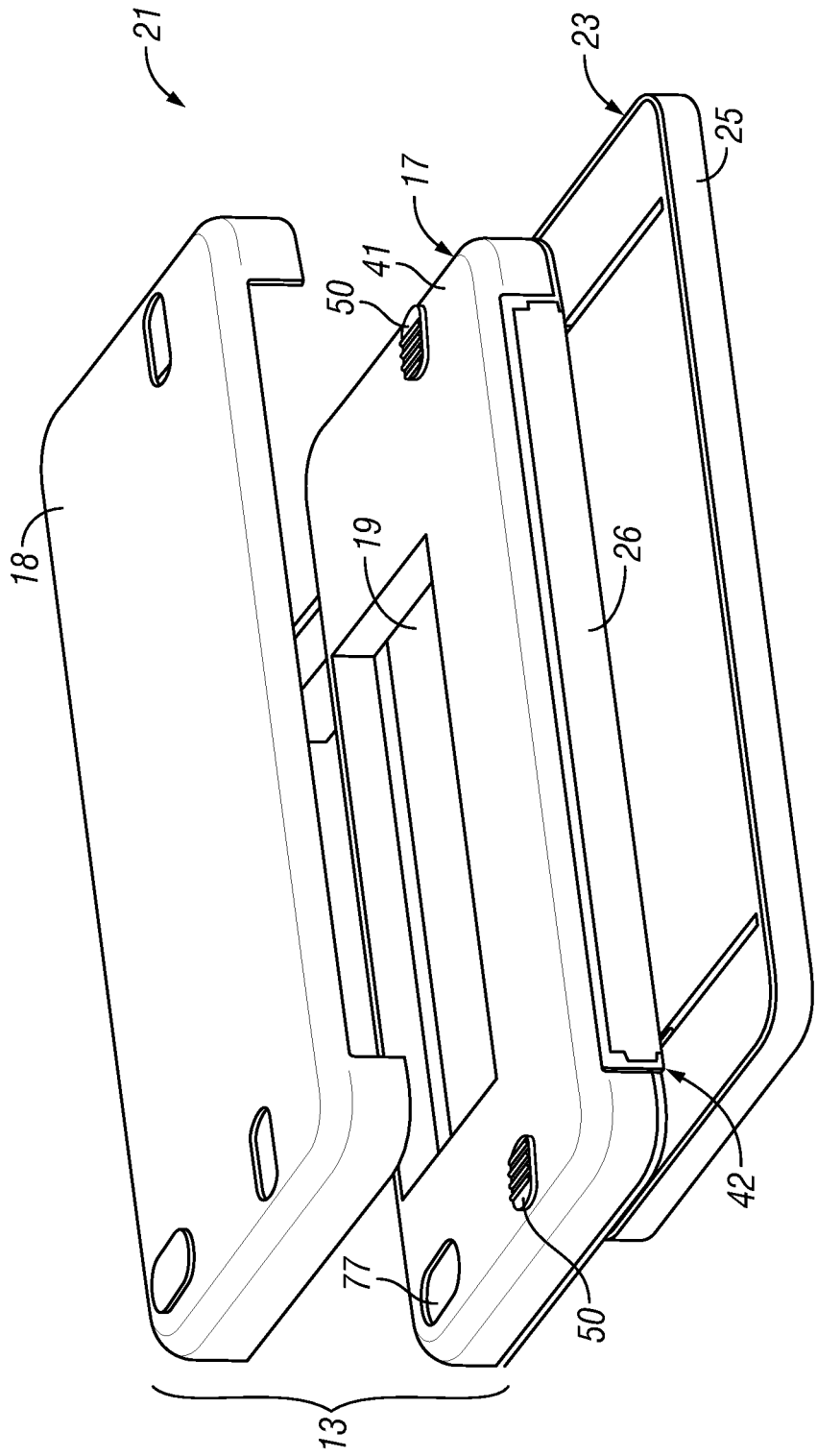

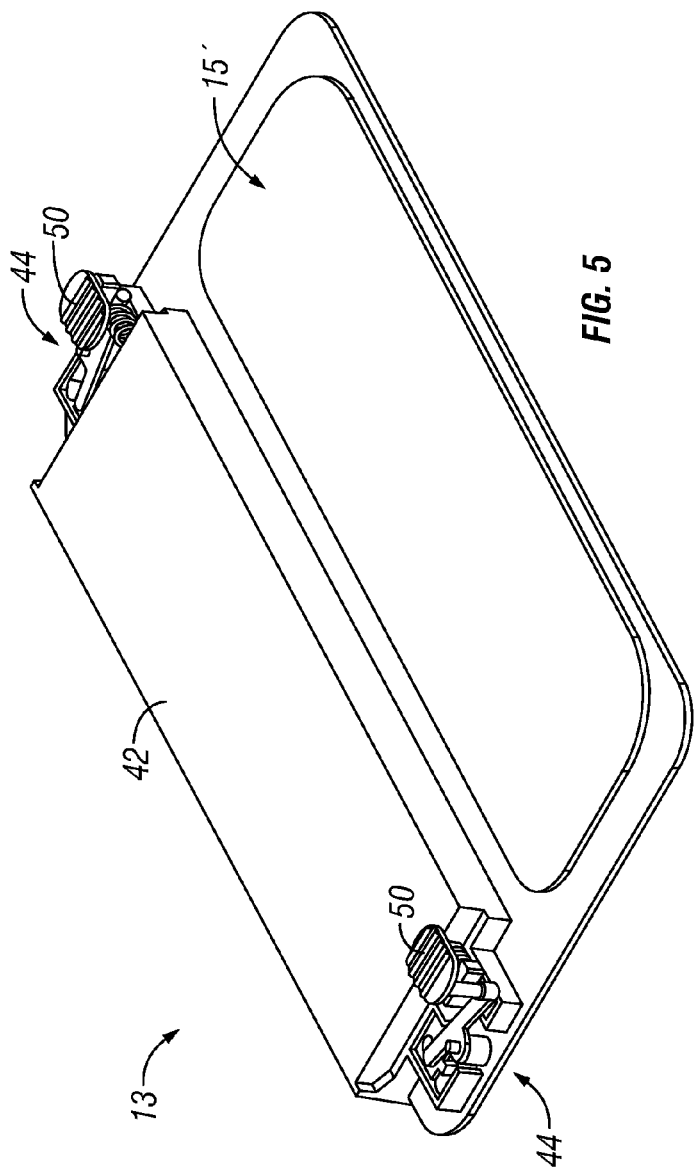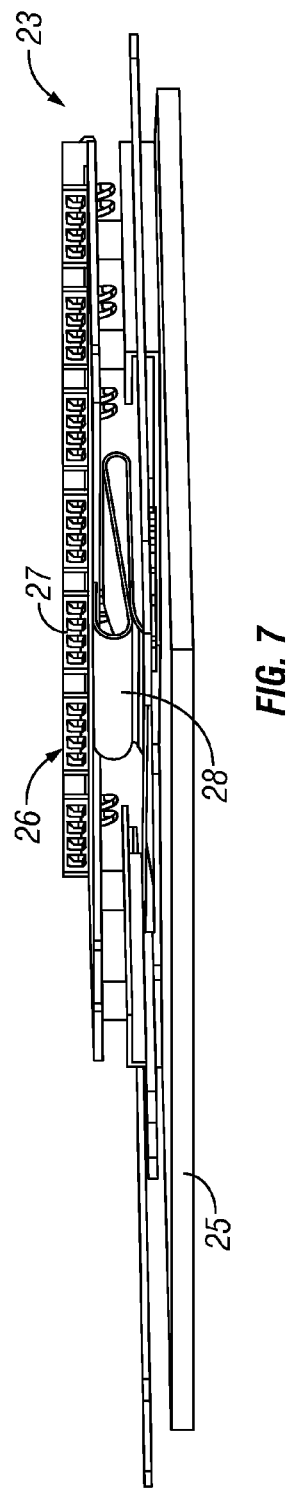

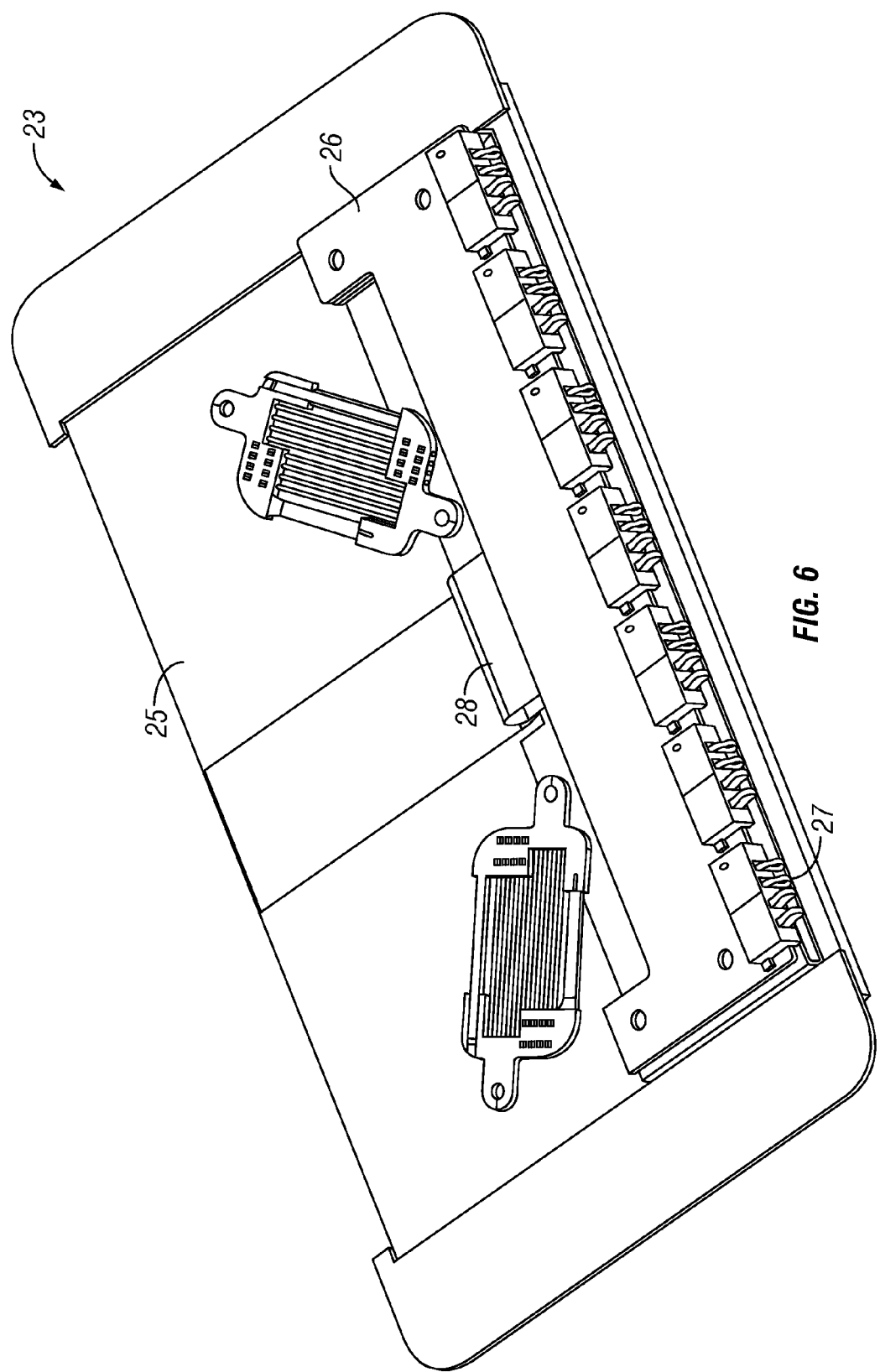

MODULAR SYSTEM HAVING CROSS PLATFORM MASTER DEVICE

CROSS REFERENCE

This application is a Continuation-in-part of U.S. patent application Ser. No. 13/186,397, filed Jul. 19, 2011, and claims the benefit of U.S. Provisional Patent Application No. 61/467,378, filed Mar. 24, 2011. These applications are fully incorporated by reference as if fully set forth herein.

BACKGROUND OF THE INVENTION

1. Field of the Invention

The present invention is directed to a modular system of devices, in which a master device can be combined with one or more of the other devices in the system to expand functionalities and features in different platforms and/or form factors.

2. Description of Related Art

The evolution of portable personal electronic devices has changed the life of consumers. For example, notebook computers, cellular phones, etc., provided utility and convenience to consumers which were not possible just 20 years ago. Some of the smaller portable electronic devices are developed with features and functionalities that rival comparably larger devices. For example, smartphones are now provided with sufficient processing power that can run applications but which were only available in larger notebook computers before.

Heretofore, handheld personal electronic devices have been developed in various form factors, each designed to optimize certain application utilities to users. For example, smartphones (e.g., Apple iPhone) have smaller form factors, as compared to tablet computers (e.g., Apple iPad). Smartphones are primarily used for telecommunication, which also provide access to the Internet, and run entertainment and productivity applications. Tablets, which have larger and higher resolution display screens as compared to smart phones but are lighter in weight than notebook computers, are primarily used as a consumer tool for providing access to the Internet, run entertainment and productivity applications, and in some models, also providing telecommunication function. Tablets require larger batteries in order to support relatively higher power consumption by the larger displays and other power consuming devices within the larger form factor of the tablets.

As can be appreciated, there are significant overlap of hardware and software functionalities and features between smartphones and tablets. With the development of increasingly more powerful and feature packed smartphones, the capabilities (e.g., processing power) of smartphones are comparable with the larger tablet computers and notebook computers, with the screen size and resolution and battery size being the significant differences between the devices of different form factors. For a user who wishes to have the convenience of a smartphone for telecommunication but also the enhanced display of a tablet, the user must purchase both devices, despite the redundant functions and features of the devices of different form factors. To ensure full functionality that the user is accustomed to when the user switches between devices, similar applications must be loaded in both devices. Further, certain data (e.g., personal data) entered in one device must be exchanged or synchronized with the other device, to make similar data available to the user when the user switches between devices. Heretofore, data synchronization applications are not robust enough to provide seamless, error free data synchronization.

The parent U.S. patent application Ser. No. 13/186,397, which has been commonly assigned to the assignee of the present invention, discloses a modular system of devices, in which a (master) device can be combined with one or more other (slave) devices in the system to transform to functional electronic devices (e.g., handheld cellular phone, tablet computing device, notebook PC device, netbook device, etc.) having expanded functionalities and features in expanded form factors and/or different platforms. The modular system reduces redundancy among the components of the various devices in the system, and instead improves operability with optimized and/or enhanced functionalities and features, as the master device transforms to a larger form factor and/or a different platform by combining with a slave device. When the master device has transformed from one form factor and/or platform into another by combining with one or more slave devices, the master device provides control and/or stored data to operate the slave devices. The master device and slave devices share certain control, hardware, software and data, to reduce redundancy between devices of various form factors and/or platform, in a manner that provides additional or different functions and features in an optimized and/or enhanced manner as the form factor and/or platform changes from one to another. The master device is docked to different slave devices via a physical port or interface and a data/electrical port or interface, so as to complete different functional electronic devices of different form factors and/or platform, to achieve enhanced functionalities or a different set of functionalities.

In one aspect of the invention disclosed in the parent U.S. patent application Ser. No. 13/186,397, when undocked, the master device is independently functional with its own set of features. For example, a smart phone has its own operating system (O/S), a system processor (e.g., a central processing unit (CPU), which is a general purpose processor, or a multi-function processor, which controls the various aspects of the system), a basic input/output system (BIOS) (which may be part of the system processor), memory (e.g., flash memory, RAM, solid state drive, etc.), display, keyboard, microphone, speakers, associated analog and digital circuitry, battery, etc. In one embodiment, the slave device is a dumb base device with limited features and functionalities, without any, or any significant, processing power of its own, and having different I/O specification (e.g., graphics resolution, audio, etc.). For example, a tablet-like slave device has memory (e.g., flash memory, RAM, solid state drive, etc.), display, keyboard, microphone, speakers, associate analog and digital circuitry, battery, etc., but no system processor. When the master device is docked to the larger slave device, the master device's system processor and operating system are used to run the slave device, and further the application programs residing in the master device, in the physical peripheral environment provided by the slave device (e.g., enhanced display). Additional application software may be installed in the slave device, which the master device system processor can run as well.

While the modular system disclosed in the parent U.S. patent application Ser. No. 13/186,397 overcame the drawbacks of the prior art, it is desirable to develop a system that can further reduce the redundancies between devices, in hardware, software as well as data, while providing versatility across platforms and/or form factors.

SUMMARY OF THE INVENTION

The present invention provides a modular system of devices, in which a (master) device can be combined with one or more of the other (slave) devices in the system to form a functional electronic device (e.g., handheld cellular phone, tablet computing device, notebook PC device, netbook device, etc.) having different functionalities and features in different form factors across various platforms. The modular system reduces redundancy among the components of the various electronic devices across different platforms, and instead improves operability with optimized and/or enhanced functionalities and features, as the master device transforms to different form factors and/or platforms by combination with different slave devices.

In one aspect of the present invention, when the master device has transformed from one form factor and/or platform into another by combining with one or more slave devices, the master device provides control and/or stored data to operate the slave devices. The master device and slave devices share certain control, hardware, software and data, to reduce redundancy between devices of various form factors and/or platforms, in a manner that provides additional or different functions and features in an optimized and/or enhanced manner as the form factor and/or platform changes from one to another. The master device is operatively coupled or docked to different slave peripheral units via a physically interface and a data/electrical interface, to complete different functional electronic devices of different form factors and/or platform in order to achieve enhanced functionalities or a different set of functionalities.

The master device is not functional independently on its own (with its own set of features and functions) without coupling to a slave device. The master device requires at least a peripheral component (e.g., a display module) to become an overall functional unit. In one embodiment, the master device does not comprise any graphical image display device (e.g., a display panel module) providing a graphical display of data and information to the user. The master device may include internal components common for applications across different platforms (e.g., a processor, memory, keyboard, and battery), which may be used with different slave devices of different form factors across different platforms. The master device may include certain application specific components that may not be relevant to different applications on different form factors and/or platforms.

The slave device is a peripheral unit (i.e., a dumb unit) serving one or more peripheral functions for at least one specific application (e.g., cellular phone application), without any or a significant processing power of its own. The slave device may have limited processing power or limited co-processing power in comparison to the processing power of the master device, such as limited processing of drivers for graphics, human interface devices, etc, or other control functions and peripheral components uniquely associated with the slave device. Different slave devices may be designed and configured with an appropriate set of peripheral components (e.g., display, microphone, speakers, antenna, etc.) optimized for specific applications when used in conjunction with the master device. For certain applications, given the high level of physical integration of components within a physical unit to optimize form factor, and the desire to optimize performance specific to a particular application, different slave devices may have some level of redundancy (e.g., different slave devices may have different types of speakers, microphones, etc. optimized for the particular desired applications).

For example, if the slave device is designed and configured for cellular phone application in conjunction with the master device, the slave device may include at least one cellular phone specific peripheral components (e.g., a cellular antenna) and may further include a speaker, a microphone, and other peripheral components that may be associated with and optimized for cellular phone functions and more specifically handheld cellular phone application. The master device may be installed with a powerful processor that runs various software applications installed in the master device when coupled to the cellular phone, and the master device can continue to run these applications, under the environment of another slave device (e.g., a tablet device, for enhanced graphics and audio, enhanced wireless reception, etc.), without the need for redundant applications to be installed in the slave device.

In one embodiment, the master device is substantially contained in at least one of the slave devices upon coupling thereto, or the external body profile of the master device is substantially flush with the external body profile of at least one of the slave devices.

BRIEF DESCRIPTION OF THE DRAWINGS

The accompanying drawings are included to provide a further understanding of the invention, and are incorporated to constitute a part of this specification. The drawings illustrate embodiments of the invention and, together with the description, serve to explain the principles of the invention. In the following drawings, like reference numerals designate like or similar parts throughout the drawings.

FIG. 1A illustrates a master device and a slave device in a decoupled state in accordance with one embodiment of the present invention; FIG. 1B illustrates the master device and the slave device in a coupled state; FIG. 1C illustrates the slave device with the display slid over the keyboard of the master device.

FIG. 2 illustrates the master device coupled to a different slave device, in accordance with one embodiment of the present invention; FIG. 2A is a rear view and FIG. 2B is a rear view.

FIG. 4 illustrates the rear view of the base unit operatively coupled to a cellular handset display module in accordance with one embodiment of the present invention.

FIG. 5 illustrates the rear view of the base unit in accordance with one embodiment of the present invention.

FIG. 6 illustrates the rear view of the cellular handset display module, in accordance with one embodiment of the present invention.

FIG. 7 is a side view of the cellular handset display module, in accordance with one embodiment of the present invention.

FIG. 8 illustrates the latching mechanism on the base unit in accordance with one embodiment of the present invention.

DESCRIPTION OF THE INVENTION

Figure 3A:
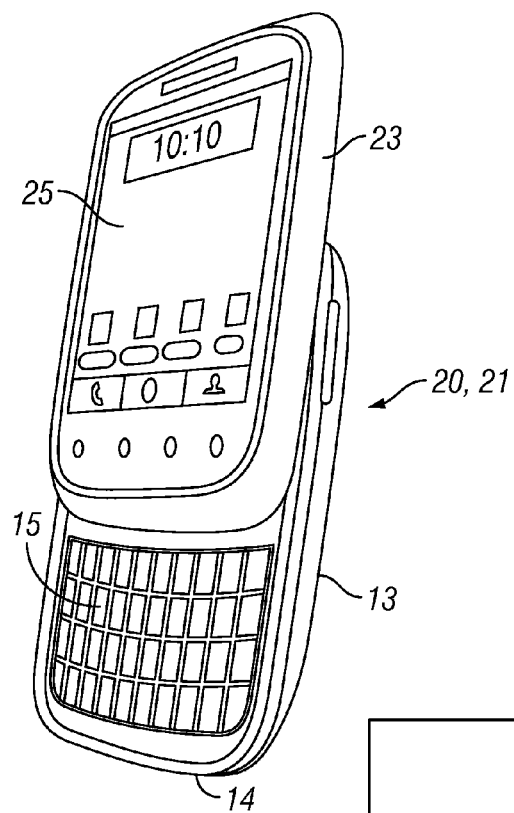
FIG. 3A is an image of a cellular handset device in accordance with one embodiment of the present invention.

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by reference to the appended claims.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Referring to the embodiment illustrated in FIGS. 1 and 2, the modular system 10 in accordance with the present invention comprises a master device 12 that is compatible with at least two slave devices 22 and 32 to alternately complete two separately functional electronic devices 20 and 30 of different form factor and platform. By way of example and not limitation, the master device 12 is a base unit that 13 can be used in conjunction with a first slave device 22 in the form of a smaller display module 23 to form a first functional electronic device 20 in the form of a handheld cellular handset device 21, and a second slave device 32 in the form of a larger display module 33 to form a second functional electronic device 30 in the form of a tablet computing device 31 (e.g., an e-book). In the illustrated embodiment, the master device does not comprise any dynamic graphical image display device (i.e., a two-dimensional liquid crystal display panel module) providing a dynamic graphical display of data and graphical information dynamically to the user. The master device may however comprise limited function status indicator lights (e.g., on/off lights) for specific limited designations.

In the illustrated embodiment, the cellular handset device 21 is the first electronic device 20, of the type having a base unit 13 and a sliding display module 23, generally referred by consumers as "slider" type of cellular handset 21. The small display module 23 is removably coupled/attached to the base unit 13 to complete the cellular handset device 21. The base unit 13 is the master device 12 in this case, and the display module 23 is the first slave device 22. The tablet computing device 31 is the second electronic device 30, of the type having a large display module 33 spanning almost the entire form factor of the tablet device 31. The same base unit 13 is insertable/coupled into a complementary slot in the body of the large display module 33, to complete the tablet device 32. Accordingly, the master device 12 (i.e., the base unit 13) is compatible for use in a cellular handset device 21 having a significantly smaller form factor and a different platform compared to those of the tablet device 31.

Figure 3B:
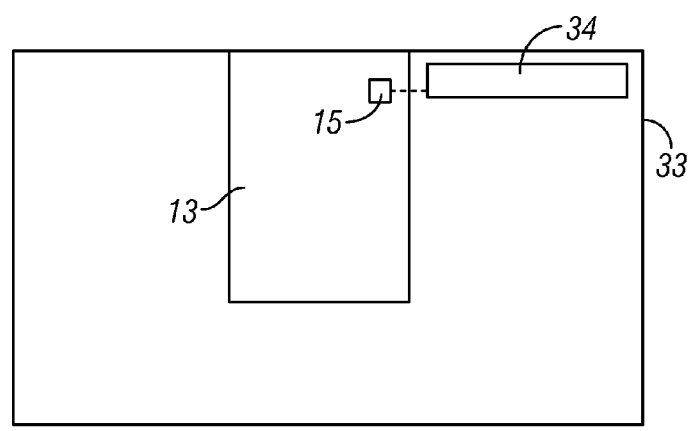
FIG. 3B is a schematic diagram of a tablet device in accordance with one embodiment of the present invention.

The base unit 13 includes a main system processor (e.g., a central processing unit (CPU)), an operating system (O/S), a basic input/output system (BIOS) (which may be part of the system processor), one or more controllers (e.g., display controller, I/O controller, etc.), data storage components (e.g., flash memory, RAM, solid state drive, etc.), associated analog and digital circuitry, a power pack, a rear facing camera 77 (e.g., a 8M-pixel CCD camera; FIG. 2A), etc. In the illustrated embodiment, the base unit 13 also includes a keyboard 15, and circuit components associated with cellular functions. FIG. 3A illustrates an image of an embodiment of a cellular handset 21 of the slider type. The base unit 13 may also include an internal wireless (e.g., cellular) antenna. Specifically, the internal antenna 14 is located at lowest edge of the base unit 13. Referring to FIG. 3B, the tablet device 31 may also include an antenna 34. When the base unit 13 is coupled to the display module 33, a switch 75 (e.g., a mechanical switch, a electronic sensor, etc.) provided on the base unit selects the wireless reception coupling 16 between the antenna 14 on the base unit 13 and the antenna 34 in the display module 33 depending on the tablet mode or cellular handset mode of operation. The same switch 75 may be used to determine generally between the cellular handset mode and the tablet mode to switch other functions. These aspects will be disclosed in greater details below.

An operating system is understood by those skilled in the art to include master control program that runs the electronic device (e.g., a cell phone, a notebook computer, etc.). The operating system sets the standards for all application programs that run in the particular electronic device. The application programs "talk to" the operating system, for example, for user interface and file management operations. The operating system typically performs functions including user interface management, job management, task management, data management, and device management, among other tasks. On the other hand, a BIOS, however, is understood by those skilled in the art to include a limited set of basic routines in an electronic device, which are stored on a chip and provides an interface between the operation system and the hardware in the electronic device. The BIOS supports the peripheral functions and basic internal services such as the real-time clock (time and date). Upon startup (booting) of the electronic device, the BIOS tests the system and prepares the electronic device for operation by querying its own small memory bank for drive and other configuration settings. The BIOS then loads the operating system and passes control to it.

The smaller cell handset display module 23 contains a display panel 25 (which may be a touch panel including soft touch keys), and other I/O components such as speakers (or receiver for the user's ears), front facing camera, etc., and may also include a GPS receiver/antenna.

The larger tablet display module 33 contains a touch panel display panel 35, a larger battery pack, a cellular antenna, a Wi-Fi and other wireless antenna (which may be part of antenna 34), and other I/O components such as speakers, front facing camera, etc. Given the larger form factor of the tablet display module 33, the antenna 34 can be located at a better position for better performance, as compared to the location of the internal antenna 14 in the base unit 13. The antenna 34 of the tablet device 31 could be of a type and positioned at a location that provide enhanced reception, compared to that of the cellular handset device 21.

Given the applications and requirements of the tablet 31 and the cellular handset 21 are different, the above noted components may be of significantly different specification (e.g., different quality, resolution, capacity, etc.). For example, the front facing camera and the larger tablet display panel 35 could be of higher resolution than the front facing camera and smaller cell handset display panel 25. The built-in battery pack of the larger tablet device 31 would be required to be larger than the battery pack of the smaller cellular handset device 21, since the larger display panel 35 in the tablet device 31 consumes more power.

Referring to FIG. 4, the base unit 13 has a body 17 and a housing 18. The body 17 includes a cavity 19 for receiving a battery (not shown), and the housing 18 covers the body 17 to retain the battery therein. FIG. 4 illustrates the cellular handset display module 23 attached to the body 17 of the base unit 13. Specifically, the handset display module has a coupling base 26 on which the display panel 25 is slidably coupled/attached. The coupling base 26 of the display module 23 is removably attached to the body 17 of the base unit 13. FIG. 5 shows the cover 41 of the body 17 removed, exposing the underside 15' of the keyboard panel 15. As can be seen, the cavity 19 is defined at the underside 15' of the keyboard panel 15. The underside of the coupling section 42 of the body 17 is shown. Referring also to FIG. 1A, the coupling section 42 is configured to receive the coupling base 26 of the display module 26.

The base unit 13 has electrical and data contacts 43 (FIG. 8) for communicating with complementary contacts 27 (FIG. 6) on the coupling base 26 of cellular handset display module 23. In the illustrated embodiment in FIGS. 6 and 8, there is a multi-pin contact 43 for communicating control signals, data and power from the base unit 13, via the multi-pin contacts 27 to the components provided on the handset display module 23 (e.g, speakers, display panel, etc.). Referring also to FIG. 7, a flexibly printed circuit 28 (FPC) electrically connects the coupling base 26 to the display panel 25 that is slidably coupled/attached to the coupling base 26 (the coupling base 26 is slidable relative to the display panel 25). Once the cellular handset display module 23 is removably attached to the base unit 13 (i.e., the coupling base 26 of the display module 23 is attached to the coupling section 42 of the base unit 13), they form a complete fully functional electronic device, namely a cellular handset 21.

Figure 8A:
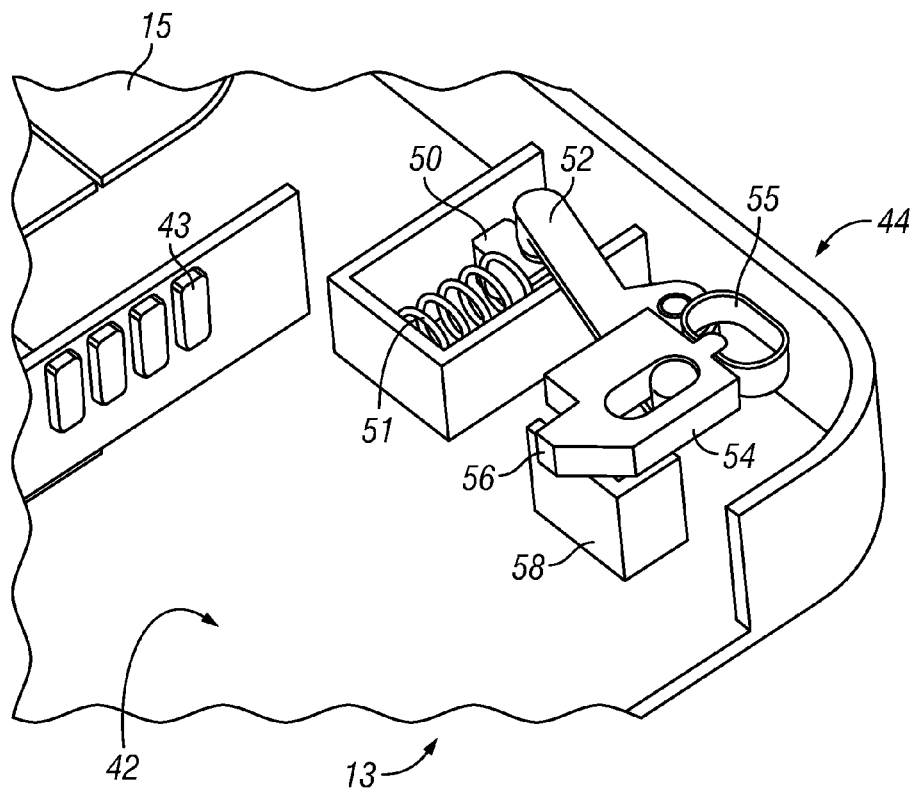
FIG. 8A is a top view with trim removed.
Figure 8B:
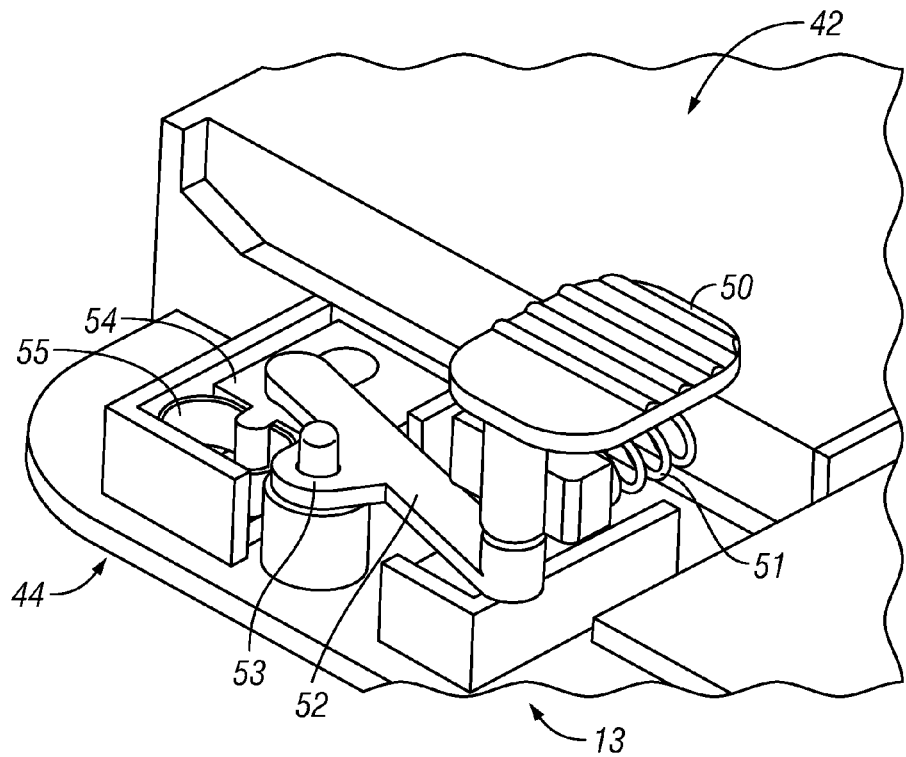
FIG. 8B is a rear view with cover removed.

Latch mechanisms 44 are provided to securely retain the cellular display module 23 to the base unit 13. The housing 18 is provided with matching openings for these latches 44 (FIG. 4). FIG. 8 illustrates in detail the configuration of the latches 44. FIG. 8A is a top view (keyboard side) of the base unit 12, with the trim cover around the keyboard 15 removed to show the parts of the internal latch mechanism. FIG. 8B is a bottom view (opposite the keyboard side) of the base unit 12, with the cover 41 of the body 17 of the base unit 13 removed to show the parts of the internal latch mechanism. Each latch mechanism 44 includes a tab 50 that is biased by a spring 51 to move horizontally inwards against the spring bias. The tab 50 is pivotally coupled to a lever 52 that is pivoted at 53 to push a key 54 against a spring loop 55 when the tab 51 is moved inwards against the spring bias. The tip 56 of the key 54 is thereby retracted horizontally. The tip 56 of the key 54 is provided with an angled cam surface 58, which facilitates pushing the tip 56 of the key 54 outwards when a surface pushes against the cam surface 58.

Figure 9:
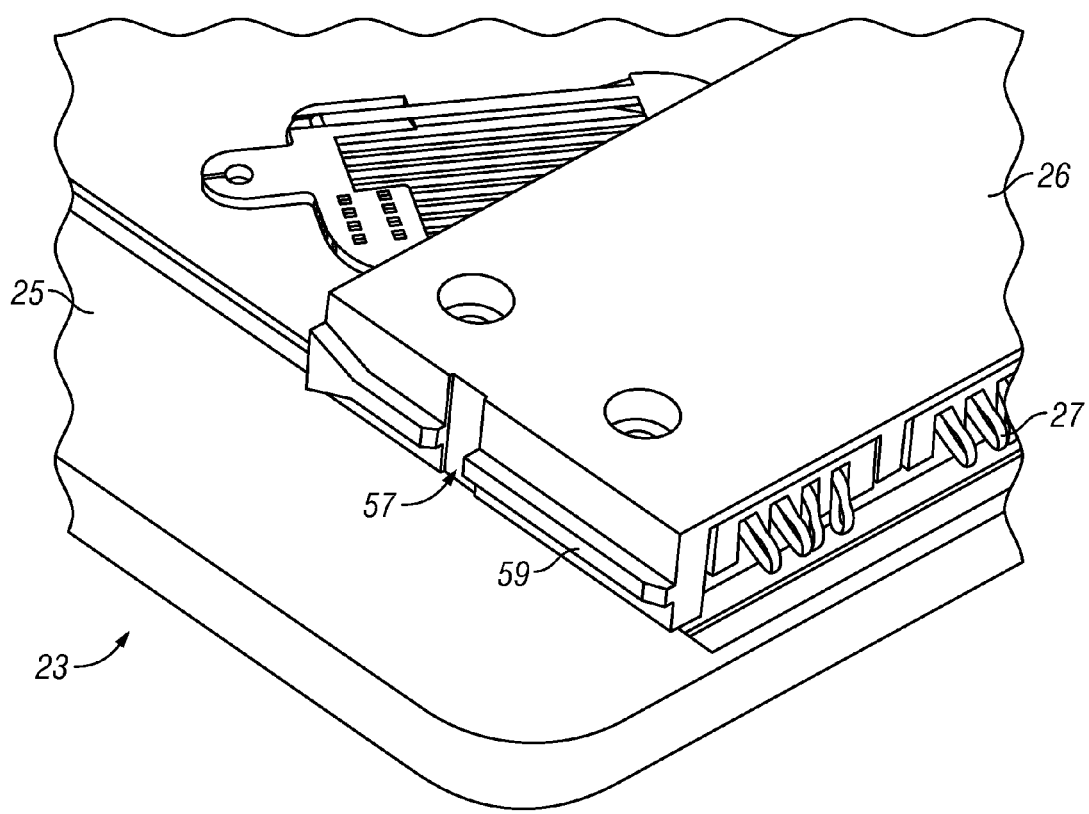
FIG. 9 is an enlarged rear view of the cellular handset display module.

Based on the above described configuration of the latch mechanism 44, when the cellular handset display module 23 is coupled to the base unit 13 by sliding the coupling base 26 into the coupling section 42 in the base unit 13 (see FIG. 1A), the guide 59 on the side of the coupling base 36 pushes the cam surface 58 to bias the tip 56 of the key outwards, until the tip 56 match up with an indexing notch 57 provided along the guide 59 (see FIG. 9) and the tip 56 rest in the notch 57 under bias from the spring loop 55. The cellular display module 23 is therefore securely attached to the base unit 13 in this mode. See also FIG. 4.

To release the cellular display module 23 from the base unit 13, the tab 51 is moved inward, thereby pushing the key 54 to move outwards to retract the tip 56 out of the notch 57 in the guide 59 on the side of the coupling base 26. The cellular display module 23 can then be slid out of the base unit 23 (see FIG. 1A).

Figure 3C:
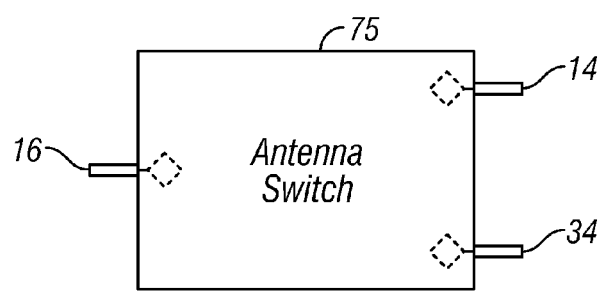
FIG. 3C is a schematic diagram of an antenna switch in accordance with one embodiment of the present invention.

The base unit 13 is configured to recognize (e.g., also via the switch 75 in FIG. 3) that a cellular handset display module 23 has been attached thereto, and the base unit 13 will operate in a mode specifically designed for this particular slave device (i.e., adjust its operations, functions and features to be specific to the cellular handset device 23). The user can slide the display panel 25 outward to expose the keyboard 15 (FIG. 1B), or inward to cover the keyboard 15 (FIG. 1C).

Figure 10:
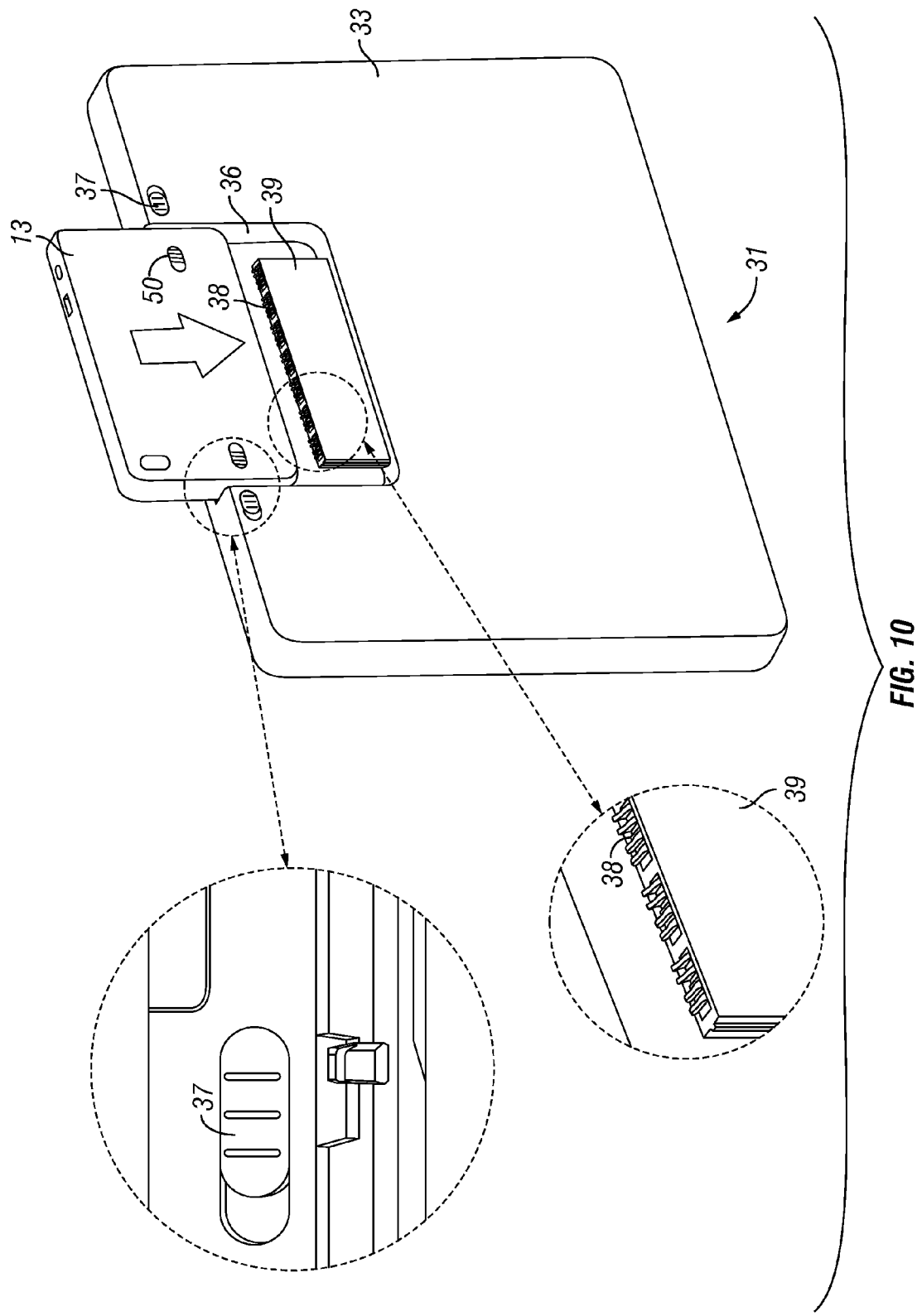
FIG. 10 is a schematic view illustrating operative coupling of the base unit with the tablet device, in accordance with one embodiment of the present invention.

Referring to FIG. 10, to use the base unit 13 for the tablet device 31, the cellular handset display module 23 is detached from the base unit 13, and the base unit 13 is inserted into the cavity 36 provided at the back of the tablet display module 33, to form a complete fully functional electronic device in another platform and form factor, namely a tablet computing device 31. The base unit 13 is configured to recognize that a tablet display module 33 has been attached as a slave device, and the base unit 13 will operate in a mode specifically designed for this particular slave device (i.e., adjust its operations, functions and features to be specific to the tablet device 33). Latches 37 are provided to securely retain the base unit 13 to the tablet display module 33. (These latches 37 may be configured and operate in a similar fashion as the latches used to secure battery packs in notebook computers known in the art.) In this embodiment, the external body profile of the master device/base unit 13 is substantially flush with the external body profile of the table display module 33. It can be deemed that the master device/base unit 13 is substantially contained in at least the tablet display module 33 upon operatively coupling and docking.

The tablet display module 33 also has electrical and data contacts 38 for communicating with the complementary contacts 27 on the base unit 13, including contacts for the antenna 34 built in the tablet display module 33 (i.e., an "external antenna" to the base unit 23). The contacts 38 may be supported on a pedestal 39, which resembles the coupling base 26 of the cellular display module 23 (see FIGS. 4, 6 and 7). This set of contacts 38 on the tablet display module 33 may be the same or different from those on the cellular handset display module 23. Some of the contacts 38 may be shared with the cellular handset display module 23 for similar or different functions. The base unit 13 may switch to using the external antenna 34 in the tablet display module 33, if the base unit 13 and the display module 33 provide an RF external connector in the interface. Since the internal antenna 14 in the base unit 13 could be affected by other components in the tablet display module 33 (e.g., the liquid crystal module and driving electronics), it would be better to use the external antenna 34. In an alternate embodiment, the handset display module 23 is provided with an internal antenna and the base unit 13 does not include an internal antenna. The master base unit 13 will then switch to operate with the antenna in the handset display module 23 or the tablet display module 34, depending on the mode of operation.

According to the foregoing description, the master device 12 (base unit 13) provides compatibility and interchangeability for different slave devices 22 (cellular display module 23) and 32 (tablet display module 33) to form electronic devices 20 (cellular handset 21) and 30 (tablet device 31) of different platform and/or form factor, which has compatible physical and electrical docking/coupling interfaces.

In the above embodiment, the slave devices 22 and 32 may be a "dumb unit" with limited features and functionalities, but having different I/O specification (e.g., graphics resolution, audio, etc.) The master device 12 (based unit 13) may be installed with a powerful processor that runs various software applications when operatively coupled/docked to the slave devices. The system software (i.e., operating system) of the master device 12 is configured to switch between control of the components of the cellular display module and the components of the tablet display module (e.g., touch interface, display panel, speakers, microphone, etc.). For example, when operatively coupled/docketed to the cellular handset display module 23, the master device 12 would run certain application under the environment of the cellular handset 21, with the smaller display module 23, etc. When operatively coupled/docked to the tablet device, the master device 12 can continue to run same or other applications, under the environment of the tablet device 31, for enhanced graphics and audio, enhanced wireless reception, etc., without the need for redundant applications to be installed in the tablet device 31. For example, when operatively coupled/docked in the tablet mode, the master device 12 is configured to control the attached display module 33 to display larger icons at better resolution and switches to use the antenna 34 in the tablet display module 33 which has a better reception, as compared to the handset mode in which the base unit internal antenna 14 is used.

In one embodiment of the present invention, the master device 12 is configured to allow switching control of the slave devices 22 and 32 in a "hot swap" manner, without requiring power down of the master device 12 and/or the slave devices 22 and 32.

In another aspect of the present invention, an enhanced charging and power management scheme is provided to optimize power management for the master device and/or the slave device 32 (e.g., the tablet display module 33 having a power pack) to which the master device is attached. The scheme may be user programmable to dynamically allocate as between the master device and slave device, the charging power, the charging priority, etc., based on power usage and battery charge levels in the master device and the slave device. According to the present invention, contrary to a normal USB interface in which a master provides power to a slave, where the master device (e.g., as part of its operating software) is configured to provide power to the slave device, the slave device in accordance with the present invention (e.g., the tablet device) provides power to the master device, depending on the charging condition.

Further, an example of power management based on capacity and availability: Assume master device battery level is "X" and slave device battery level is "Y". If X, Y<80% then charge X to 80% first and charge Y to 80% next, then trickle charge together. If X>80% Y<80%, divide the charging current by trickle charging X and fast charging Y. If X, Y>80%, then trickle charge together. Similar power management scheme disclosed in copending U.S. patent application Ser. No. 13/186,397 may be adopted in the present invention.

Figure 11:
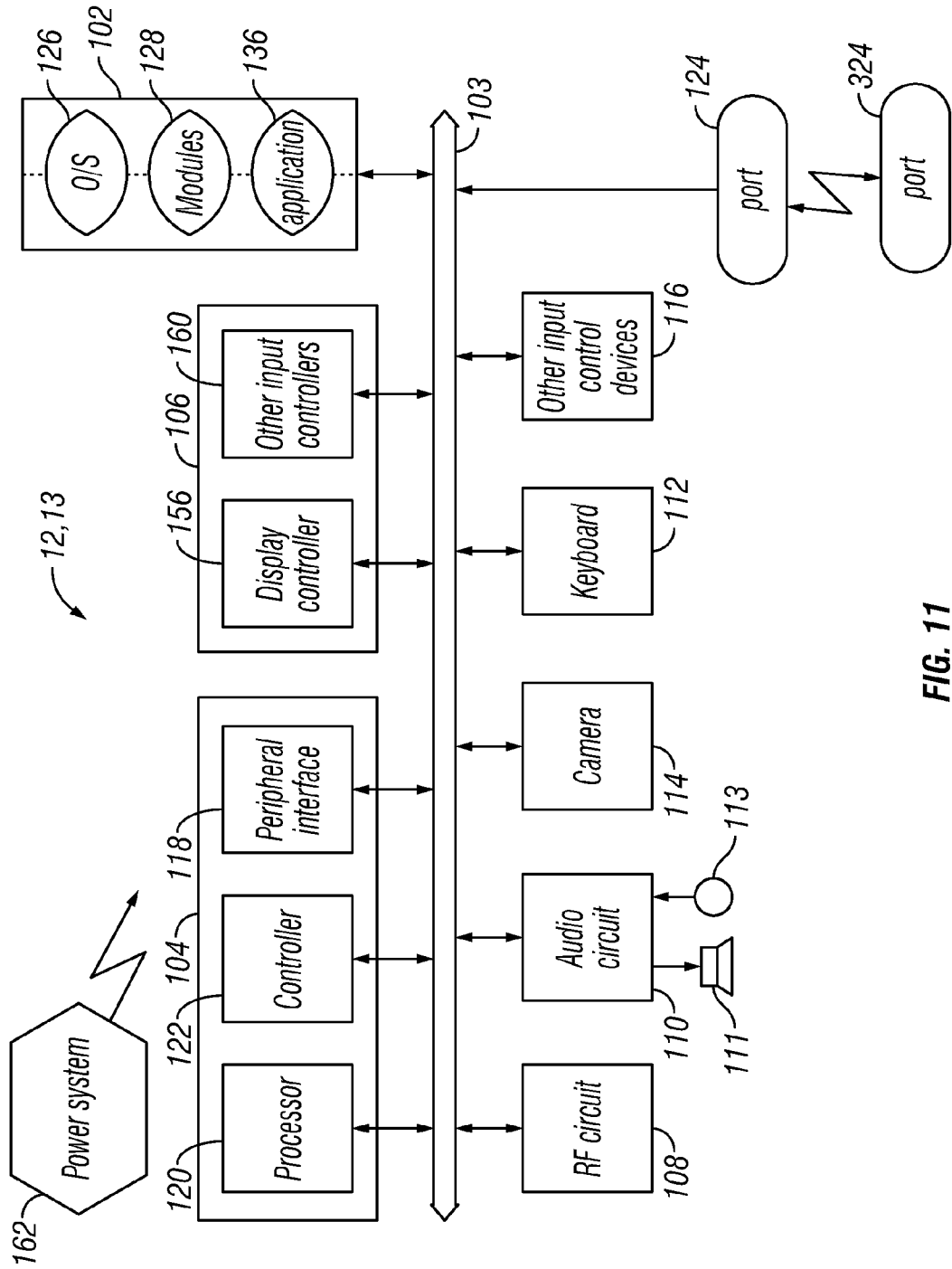
FIG. 11 a block diagram of a master device in accordance with one embodiment of the present invention.

FIG. 11 is a block diagram schematically illustrating the components of the base unit 13 in accordance with one embodiment of the present invention, which implements the various functions, features and structures described above. The base unit 13 includes a memory 102 (e.g., one or more computer readable storage mediums, such as high-speed random access memory, and non-volatile memory), a memory controller 122 controlling access to memory 102 by other components; one or more processing units (CPU's) 120 running or executing various software programs and/or sets of instructions stored in memory 102 to perform various functions when the base unit 13 is attached to a slave device (e.g., display module 23 or 33) and to process data; a peripherals interface 118 coupling the input and output peripherals of the base unit 13 and the slave device attached thereto to the CPU 120 and memory 102; an RF circuitry 108 including an antenna/radio for receiving and sending electromagnetic signals, and communicates with communications networks (e.g., GSM and/or WiFi networks) and other communications devices via the electromagnetic signals based on known wireless communication protocols; an audio circuitry 110; a speaker 111; a microphone 113; a camera 114; a keyboard 112; an input/output (I/O) subsystem 106; other input or control devices 116 (e.g., physical buttons (e.g., push buttons, rocker buttons, etc.), dials, slider switches, click wheels, etc); and an external port 124 for communicating with a complementary port 324 on a slave device (e.g., Universal Serial Bus (USB), coupling/docking with slave devices, power charging, etc.). The external port 124 could be implemented in the form of the multi-pin data/electrical interface having a set of contact pins 43 as described above (see also FIG. 8). These components may communicate over one or more communication buses or signal lines 103. In some embodiments, the peripherals interface 118, the CPU 120, and the memory controller 122 may be implemented on a single chip, such as a chip 104. In some other embodiments, they may be implemented on separate chips.

When the base unit 13 is operatively coupled to a slave device, the I/O subsystem 106 operatively controls the input/output peripherals on the base unit 13 (e.g., the keyboard 112, other input control devices 116) and those on the slave device (such as the touch screen panel 25 on the cellular display module 23 and other input/control devices, or the touch screen panel 35 on the tablet display module 33) to the peripherals interface 118. The I/O subsystem 106 may include a display controller 156 and one or more input controllers 160 for other input or control devices. For example, the touch-sensitive touch screen panel 25 on the cellular display module 23 provides an input interface (e.g., virtual or soft buttons, soft keyboard) and an output interface between the cellular handset device 21 and a user (e.g., displaying visual output to the user). The visual output may include graphics, text, icons, video, and any combination thereof. The touch screen panel 25 may use LCD (liquid crystal display) technology, LED (light emitting diodes) or LPD (light emitting polymer display) technology. The same applies to the touch-screen panel 35 on the tablet display module 33.

The base unit 13 also includes a power system 162 for powering the various components. The power system 162 may include a power management system as disclosed above, a recharging system, one or more power sources (e.g., battery, connection to external power charger, and connection to the external port 124 to receive charging power from the slave device such as a tablet device 31 having a larger battery), a power failure detection circuit, a power converter or inverter, a power status indicator (e.g., a light-emitting diode (LED)) and any other components associated with the generation, management and distribution of power in portable devices.

The software components stored in memory 102 include an operating system 126 (e.g., Android, WINDOWS, or an embedded operating system) and various modules 128 including software components and/or drivers for controlling and managing general system tasks (e.g., memory management, storage device control, power management, etc.) and facilitates communication between various hardware and software components. The memory 102 may store, for example, a communication module that facilitates communication with other devices over one or more external ports 124 and also includes various software components for handling data received by the RF circuitry 108 and/or the external port 124; a contact/motion module for detecting and/or reading user touch/motion input (e.g., user activation of the keyboard 112 and touch screen on an attached slave device); a graphics module for rendering and displaying graphics on the display screen on an attached slave device. In addition, memory 102 may include various application tool modules 136, such as a contacts module (sometimes called an address book or contact list); a telephone module; an e-mail client module; an instant messaging (IM) module; a camera module (e.g., rear facing camera) for still and/or video images; a music player module; a browser module; a calendar module; etc.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module may be combined with music player module into a single module. In some embodiments, memory 102 may store a subset of the modules and data structures identified above. Furthermore, memory 102 may store additional modules and data structures not described above.

It should be appreciated that the base unit 13 as illustrated is only one example of a master device, and that the device may have more or fewer components than shown, may combine two or more components, or may have a different configuration or arrangement of the components. The various components shown in FIG. 11 may be implemented in hardware, software or a combination of hardware and software, including one or more signal processing and/or application specific integrated circuits (ASICs).

Figure 12:
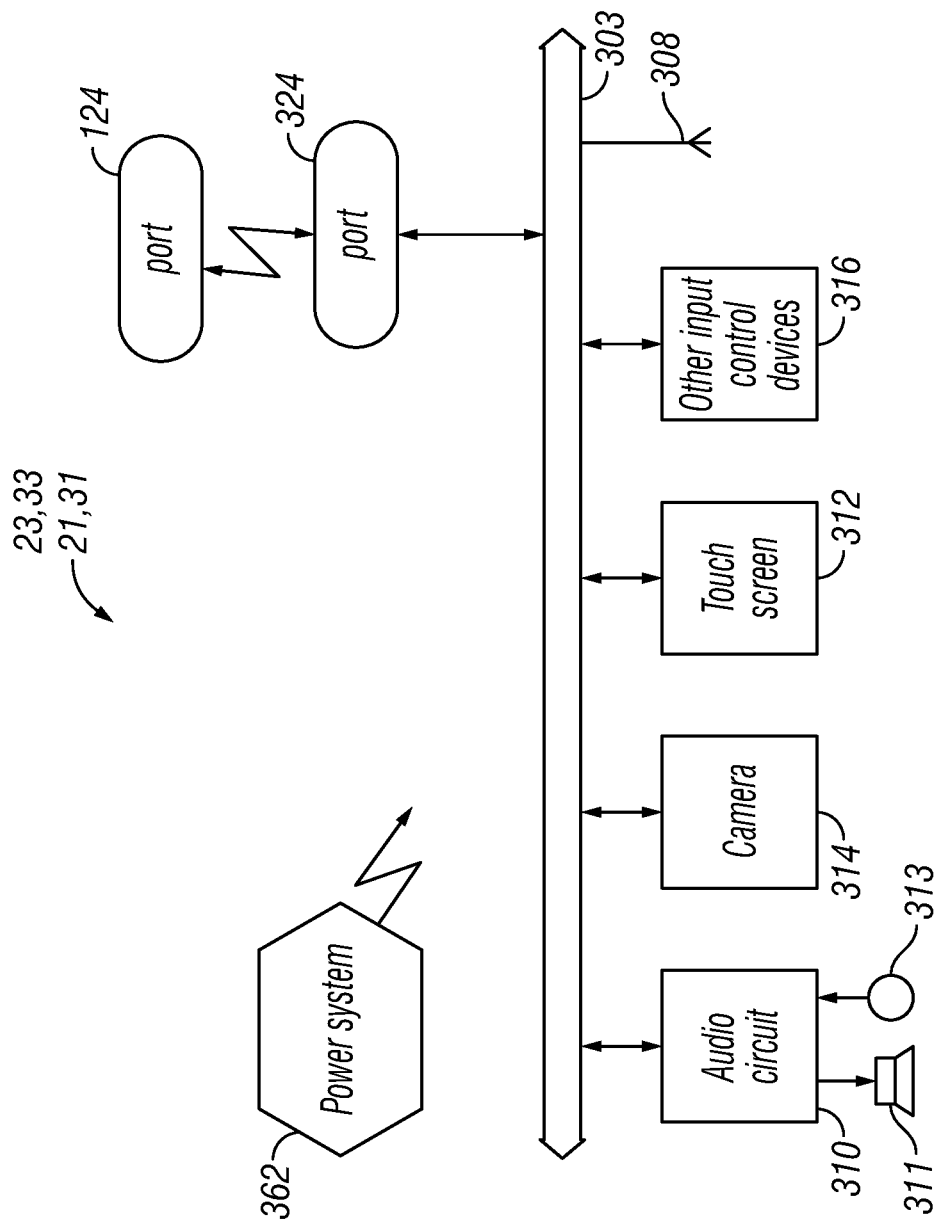
FIG. 12 is a block diagram of a slave device in accordance with one embodiment of the present invention.

FIG. 12 is a block diagram of a slave device (e.g., cellular display module 23 or tablet display module 33) in accordance with one embodiment of the present invention. Given that the slave device is a "dumb" terminal, subject to control by the base unit 13, and uses the applications stored in the base unit 13, the slave device has a relatively simpler set of passive components, as compared to the base unit 13. The slave device includes an external port 324 for communicating with the base unit 13 (e.g., Universal Serial Bus (USB), docking, charging port, etc., which could be implemented in the form of a multi-pin docking interface having a set of contact pins (27 for the cellular display module and 38 for the tablet display module) for coupling directly to the data/electrical interface on the base unit 13 described above; an audio circuitry 310; a speaker 311; a microphone 313; a camera 314 (e.g., front facing); a touch screen 312 as part of the display module for the slave device; other input or control devices 316 (physical buttons (e.g., push buttons, rocker buttons, etc.), dials, slider switches, click wheels, etc). Some of these components may be redundant to similar components provided on the base unit 13, but tuned to suit the applications and functions to be performed by the particular slave device (e.g., speakers with enhanced sound effects for a larger tablet device 31). These components may communicate over one or more communication buses or signal lines 303 with the external port 324. In addition, if enhanced wireless connection is desired, an enhanced antenna 308 may be provided for communicating with communications networks.

The visual output may include graphics, text, icons, video, and any combination thereof. The touch screen 312 may use LCD (liquid crystal display) technology, LED (light emitting diodes) or LPD (light emitting polymer display) technology. The various input/output peripherals on the slave device, such as the touch screen 312 and the other input/control devices 116, are controlled by the I/O subsystem 106 in the base unit 13 when the slave device is operatively coupled to the base unit 13 (i.e., the external port 124 on the base unit 13 and the external port 324 on the slave device are operatively coupled, either directly or indirectly via the data/electrical connectors in the cartridge, as discuss above). The peripherals such as audio circuitry 310, speaker 311, microphone 313, and camera 314 are controlled via the peripheral interface 118 in the base unit 13, via the external ports 124 and 324 when the base unit 13 is operatively coupled to the slave device.

In an alternate embodiment, a slave controller (not shown) may be provided in the slave device, which acts as a slave controlled by the controller 122 and/or processor 120 and/or the I/O subsystem 106 in the master base unit 13. This slave controller controls the operations of the various peripherals and/or I/O devices in the slave device, based on control signals received from the base unit 13.

The base unit 13 also includes a power system 362 for powering the various components. The power system 362 includes, a recharging system, one or more power sources (e.g., battery, connection for external power charger), a power failure detection circuit, a power converter or inverter, a power status indicator (e.g., a light-emitting diode (LED)) and any other components associated with the generation and distribution of power in portable devices. The power system 362 is operatively coupled to the power system 162 in the base unit 13, and may supply charging power to the base unit 13 via the external ports 124 and 324. The power system 362 may rely on the power management system of the power system 162 in the base unit 13, or include its own power management system that complements and/or coordinates with the power management system in the base unit 13.

It should be appreciated that the slave device as illustrated in FIG. 11 is only one example of a slave device, and that the device may have more or fewer components than shown, may combine two or more components, or may have a different configuration or arrangement of the components.

In the illustrated embodiment of FIG. 1, the base unit 13 is operatively coupled to a slider type cellular display module. Alternatively, not shown, the base unit 13 may be operatively coupled to a fixed type cellular display module via a different configuration of physical coupling so as to removably attach the base unit 13 to the rear of a generally flat display module.

In the illustrated embodiment of FIGS. 2 and 10, the base unit 13 is operatively coupled to a tablet display module 33 by docking the base unit 13 near an edge of the rear of the planar tablet device 31. Alternately, not shown, the base unit 13 may be docked substantially at the center of the rear of the planar tablet device 31, to provide more even weight distribution when the slave device is docked to the tablet device 31.

Other than or in addition to the cellular handset device 21 and the tablet device 31, the base unit 13 may be operatively coupled or docked to other types of slave devices (e.g., a notebook base device) via a physical port or interface and a data/electrical port or interface, to complete different functional electronic devices of different form factors and/or platform, to achieve enhanced functionalities or a different set of functionalities. Besides the illustrated cellular handset device 21 and tablet device 31, other slave devices may be designed and configured with an appropriate set of peripheral components (e.g., display, microphone, speakers, antenna, etc.) optimized for specific applications when used in conjunction with the master device. For certain applications, given the high level of physical integration of components within a physical unit to optimize form factor, and the desire to optimize performance specific to a particular application, the master and slave devices may have some level of redundancy (e.g., the master device and the slave device may have different types of displays, speakers, microphones, etc. optimized for the respective applications of the master and slave devices). The master device may work with slave devices that are configured to complete various electronic devices having different or similar form factors and/or platforms, such as a notebook computing device, a projector, and devices such as a digital photo frame device, an e-paper device, a game console, an electronic device adapted for use in a car, an all-in-one office equipment, etc. The modular system 10 reduces redundancy among the components of the various devices in the system, and instead improves operability with optimized and/or enhanced functionalities and features, as the master device transforms to different form factors and/or different platforms by combining with different slave devices.

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

The invention claimed is:

1. A modular system, comprising:
a first slave device of a first form factor and/or platform;
a second slave device of a second form factor and/or platform; and
a master device comprising a control system including a system processor and an operating system, wherein the master device is configured to operatively couple to the first slave device to form a first electronic device, and alternatively to the second slave device to form a second electronic device, wherein the master device is removably attachable to the first slave device and the second slave device, and wherein the master device is not independently functional with its own set of features without attachment to a slave device,
wherein operation of the first and second electronic device is controlled at least in part by the system processor of the master device upon operatively coupling the master device to the first and second electronic device, respectively, and
wherein the master device includes a first antenna, and the second slave device includes a second antenna, and wherein the master device switches operation from the first antenna to the second antenna when the master device is operatively coupled to the second slave device.

2. The modular system as in claim 1, wherein the master device further comprises a master electrical interface, the first slave device comprises a first electrical interface and the second slave device comprises a second electrical interface, and wherein the master electrical interface communicates with the first and second electrical interfaces when the master device is operatively coupled to the first and second slave devices, respectively.

3. The modular system as in claim 2, wherein the master device further comprising a first power source providing power to operate at least the first electronic device.

4. The modular system as in claim 3, wherein the second slave device further comprises a second power source providing power to operate the second electronic device.

5. The modular system as in claim 1, wherein master device further comprises a memory storing the operating system, application programs and data, which are relied by the first and second electronic devices when the master device has been operatively coupled to the first and second slave devices, respectively.

6. The modular system as in claim 1, wherein the operations of the first and second electronic devices are also controlled by the operating system of the master device.

7. The modular system as in claim 6, wherein the operating system in the master device provides more functionality for the first and second electronic device than any limited device specific operation routine provided by the first and second slave devices, respectively.

8. The modular system as in claim 1, wherein the first and second electronic devices are respectively controlled substantively exclusively by the system processor in the master device.

9. The modular system as in claim 8, wherein the system processor in the master device provides a higher processing power that any processor provided in the first and second slave devices, respectively.

10. The modular system as in claim 8, wherein the system processor comprises a central processor unit (CPU), which provides higher processing power than any processor provided in the first and second slave devices, respectively, including any CPU provided in the first and second slave devices, respectively.

11. The modular system as in claim 1, wherein the master device is substantially contained in at least one of the first and second slave devices upon operatively coupling thereto.

12. The modular system as in claim 1, wherein external body profile of the master device is substantially flush with external body profile of at least one of the first and second slave devices upon operatively coupling thereto.

13. The modular system as in claim 1, wherein the control system of the master device is configured to determine coupling status between the first and second slave devices, and wherein upon determining coupling of the first slave device to the master device, the master device automatically switches control to the operation of the first slave device, and upon determining coupling of the second slave device to the master device, the master device automatically switches control to the operation of the second slave device.

14. The modular system as in claim 1, wherein the first and second slave devices are first and second peripheral devices, respectively.

15. The modular system as in claim 14, wherein the first and second peripheral devices comprises first and second image displays, respectively.

16. The modular system as in claim 15, wherein the control system switches to controlling the first and second image displays, respectively, based on respective associated display characteristics upon determining operative coupling status of the master device to the first and second slave device.

17. The modular system as in claim 16, wherein the first slave device is a cellular handset display module and the second slave device is a tablet display module.

18. The modular system as in claim 1, wherein the master device does not comprise any image display device.

19. The modular system as in claim 1, wherein the master device is configured to switch control of the first slave device and the second slave device in a hot swap manner, without requiring powering down of the master device and/or the first slave device and second slave device.

* * * * *